3,049,555
3-ALKOXY-16-METHYL-1,3,5(10)-ESTRATRIEN-17-ONES

David A. Tyner, Glenview, Ill., assignor to G. D. Searle & Co., Chicago, Ill., a corporation of Delaware
No Drawing. Filed Dec. 22, 1959, Ser. No. 861,224
4 Claims. (Cl. 260—397.4)

The present invention relates to a new group of 16-methyl steroids, and more particularly to 3-alkoxy-16-methyl-1,3,5(10)-estratrien-17-ones of the structural formula

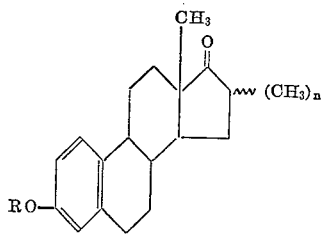

wherein R is hydrogen, methyl or ethyl and $n$ is 1 or 2.

The compounds of this invention can be conveniently prepared by distilling a solution of the 3-alkyl ether of estrone, paraformaldehyde and a dialkylamine hydrochloride, preferably dimethylamine hydrochloride, to yield 3-alkoxy-16-methylene-1,3,5(10)-estratrien-17-one. The latter compound is then hydrogenated to yield the desired 3-alkoxy-16-methyl-1,3,5(10)-estratrien-17-one. The hydrogenation is preferably carried out in the presence of a catalyst. It has been found that if the hydrogenation is conducted at 3 atmospheres pressure in the presence of a noble metal catalyst, e.g., palladium-on-charcoal, excellent results are obtained.

An alternate procedure for the preparation of these compounds involves the dehydration of a 3-alkoxy-16α-methyl-1,3,5(10)-estratrien-16β,17β-diol with an agent such as pyridine hydrochloride. During this process the 3-position ether is also cleaved to yield 3-hydroxy-16-methyl-1,3,5(10)-estratrien-17-one, which may be re-etherified, if the ether is desired, by treatment with the appropriate alkyl halide.

A third procedure is the treatment of a 3-alkoxy-16-formyl-1,3,5(10)-estratrien-17-one with methyl iodide to yield the 3-alkoxy-16-formyl-16-methyl-1,3,5(10)-estratrien-17-one. This latter compound may be decomposed by treatment with an aqueous alkali, such as aqueous potassium hydroxide, to yield the 3-alkoxy-16-methyl-1,3,5(10)-estratrien-17-ones. Both of the 16-position epimers are obtained. They may be separated by chromatography and fractional recrystallization. Either isomer can be used in the examples which follow. As a by-product there is obtained the 3-alkoxy-16,16-dimethyl-1,3,5(10)-estratrien-17-one. This can also be obtained by methylation of the monomethyl compounds by use of iodomethane. The free 3-hydroxy compound is obtained by conventional deetherification, e.g. with pyridine hydrochloride.

The 3-alkoxy-16-methyl-1,3,5(10)-estratrien-17-ones and the 16,16-dimethyl homologs thereof obtained by this invention have valuable pharmacological properties. In particular, they are anti-fibrillatory agents. They also produce the reduction in serum cholesterol/phospholipid ratio characteristic of natural estrogens but without producing feminizing side effects.

Furthermore, these compounds are valuable chemical intermediates in the preparation of 16-methyl-19-nortestosterone and the 16-methyl-17α-alkyl-19-nortestosterones according to the following reaction sequence. Thus the 17-keto group by treatment with an alkali metal borohydride, preferably sodium borohydride, can be reduced to a hydroxy group. The aromatic A ring is then subjected to a Birch type reduction with lithium and ammonia in a solvent such as tetrahydrofuran to yield a 3-alkoxy-16-methyl-2,5(10)-estradien-17-ol. This compound can then be tretated with an alkanolic solution of a weak acid, such as acetic acid in methanol, to yield 16-methyl-17-hydroxy-5(10)-estren-3-one, which is then isomerized to 16-methyl-19-nortestosterone under the influence of a basic agent, such as sodium hydroxide in aqueous methanol, or an acidic agent, such as hydrochloric acid or p-toluenesulfonic acid in aqueous methanol. In a modification of this process, the product of the Birch reduction is subjected to a more vigorous acidic hydrolysis whereby the cleavage of the enol ether function at position 3, ketonization of the resulting 3-enol and rearrangement of the 5(10) double bond into conjugation with the 3-ketone takes place as a single operation without the necessity of isolating 16-methyl-17β-hydroxy-5(10)-estren-3-one which is formed as an intermediate product.

The 17-alkyl derivatives of 16-methyl-19-nortestosterone of at least two carbon atoms in the side chain are conveniently prepared by the alkynylation, e.g. with acetylene, of a 3-alkoxy-16-methyl-1,3,5(10)-estratrien-17-one, catalytic hydrogenation of the 17-alkynyl group via the 17-alkenyl group to a 17-alkyl group, and a Birch type reduction to the 3-alkoxy-16-methyl-17α-alkyl-2,5(10)-estradien-17β-ol with lithium and ammonia, followed by a mild acidic hydrolysis. As was described hereinbefore, the conversion of the 3-enol ether compound to a 16-methyl-17α-alkyl-19-nortestosterone may be conducted as a single reaction step by a slight modification of reagents.

The 16,17α-dimethyl-19-nortestosterone is prepared by heating a 3-alkoxy-16-methyl-1,3,5(10)-estratrien-17-one with a methylmagnesium halide, preferably the bromide, to yield 3-alkoxy-16,17α-dimethyl-1,3,5(10)-estratrien-17β-ol, which can be reduced to the 16,17α-dimethyl-19-nortestosterone as described hereinabove.

The 16-methyl derivatives of 17-alkynyl and 17-alkyl-19-nortestosterones are very valuable progestational agents, particularly upon oral administration. Unlike their analogs, lacking the 16-methyl group, the 16-methyl-17-alkyl-19-nortestosterones do not interfere with the normal pressure response to desoxycorticosterone.

The compounds and methods of manufacture which constitute this invention will appear more fully in the following examples, which are to be construed as illustrative only and not limiting the invention in spirit or in scope. It will be apparent to those skilled in the art of organic synthesis that many modifications both of materials and methods may be practiced without departing from this invention. In these examples temperatures are given in degrees centigrade (° C.) and quantities of materials in parts by weight.

The present application is a continuation-in-part of copending application Serial No. 776,678. filed November 28, 1958, now abandoned.

Example 1

A mixture of 50 parts of dimethylamine hydrochloride, 15 parts of paraformaldehyde and 28.5 parts of estrone methyl ether in 250 parts of 3-methyl-1-butanol is distilled until a distillate amounting to about 60 parts is collected, following which it is heated under reflux for 1 hour. Another portion of distillate amounting to about 100 parts is collected and discarded. The cooled reaction mixture is diluted with 100 parts of 10% hydrochloric acid and extracted with several portions of ether. The combined ethereal extracts are washed with water until neutral, dried over sodium sulfate, and evaporated to leave an oily residue. Upon crystallization from benzene there is obtained 3-methoxy-16-methylene-1,3,5(10)-estratrien-17-one, melting at about 129–132° C. The compound has a specific rotation in chloroform of about +133° and shows absorption in the ultraviolet at 224 millimicrons with an extinction coefficient of about 17,030. The compound has the structural formula

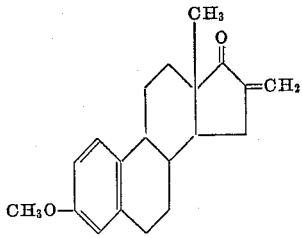

Example 2

A solution of 0.9 part of 3-methoxy-16-methylene-1,3,5(10)-estratrien-17-one is dissolved in 36 parts of ethyl acetate and then shaken with 0.09 part of 5% palladium-on-charcoal catalyst. The catalyst is removed by filtration and the solution is evaporated to dryness. The residue is recrystallized from methanol to yield 3-methoxy-16β-methyl-1,3,5(10)-estratrien-17-one melting at about 95–96° C. The compound has the structural formula

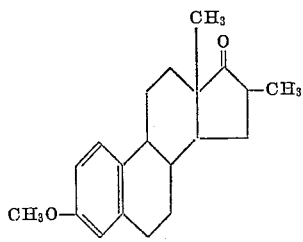

From the mother liquors there is obtained the 16α-methyl isomer more fully described in the following example.

By substituting an equimolar amount of the 3-ethyl ether of estrone for the 3-methyl ether of estrone in Example 1 and following the procedures as described in Examples 1 and 2 there is obtained 3-ethoxy-16-methyl-1,3,5(10)-estratrien-17-one. The compound shows absorption in the infrared at 5.75, 6.20, 6.33, 7.80, 7.95, 8.60, and 9.60 microns.

Example 3

A mixture of 20 parts of 3-methoxy-16-methyl-1,3,5(10)-estratrien-16,17-diol (prepared as described in German Patent 1,028,573, and copending application Serial No. 563,447, filed February 6, 1956) and 200 parts of pyridine hydrochloride is distilled at 220° C. until approximately 133 parts of the pyridine hydrochloride has been collected. The residue is cooled, digested with water, collected on a filter, washed and recrystallized from ethanol. In this manner there is obtained 3-hydroxy-16-methyl-1,3,5(10)-estratrien-17-one melting at about 272–277° C. The compound shows a specific rotation in dioxane of +151°.

A solution of 4.5 parts of 3-hydroxy-16-methyl-1,3,5(10)-estratrien-17-one, 10 parts of potassium carbonate, and 22.8 parts of methyl iodide in 120 parts of ethanol is refluxed for 15 hours under a nitrogen atmosphere. The solution is diluted with water and extracted with dichloromethane. The extracts are dried over sodium sulfate and evaporated to dryness. The residue is taken up in benzene and applied to a chromatography column containing silica gel. The column is developed with benzene and benzene solutions containing increasing amounts of ethyl acetate. Upon elution with a 1% solution of ethyl acetate in benzene there are obtained both of the 16-position epimers of 3-methoxy-16-methyl-1,3,5(10)-estratrien-17-one. The 16α-isomer is eluted first, followed by the 16β-isomer. They may be recrystallized from methanol to yield the 16α-methyl epimer melting at about 117–119° C. and the 16β-methyl epimer melting at about 95–96° C. The 16β-methyl isomer shows absorption in the infrared at 7.95, 8.0, 9.4, 9.5, 9.62 and 10.22 microns, while the 16α-methyl isomer shows absorption at 7.95, 8.08, 9.32, 9.68, 10.06, and 11.04 microns.

Example 4

A solution of 0.4 part of sodium borohydride in 2 parts of water is added to a solution of 2 parts of 3-methoxy-16β-methyl-1,3,5(10)-estratrien-17-one in 31.4 parts of 2-propanol and heated on the steam bath for 30 minutes. The solution is then diluted with water and the excess sodium borohydride is decomposed by the addition of acetic acid. The mixture is cooled in an ice bath and the product is collected on a filter. Upon recrystallization from a mixture of water and ethanol there is obtained 3-methoxy-16β-methyl-1,3,5(10)-estratrien-17β-ol melting at about 123.5 to 125° C. The compound shows a specific rotation in chloroform of +80.9°.

Example 5

A solution of 1 part of 3-methoxy-16β-methyl-1,3,5(10)-estratrien-17β-ol in 20.7 parts of tetrahydrofuran and 17.9 parts of tertiary butanol is added to 42 parts of redistilled liquid ammonia in a flask equipped with a magnetic stirrer and a Dry Ice condenser. To this solution is then added 0.5 part of lithium wire in small portions. The mixture is then stirred for 135 minutes, after which time the ammonia is displaced by the addition of 71 parts of ether and 8 parts of methanol. The ethereal layer is separated, washed with sodium hydroxide and then with water, and dried over sodium sulfate. After evaporation to dryness, the residue is recrystallized from methanol containing a small amount of pyridine to give 3-methoxy-16β-methyl-2,5(10)-estradien-17β-ol melting at about 117–129° C.

Substitution of an equimolar amount of 3-ethoxy-16-methyl-1,3,5(10)-estratrien-17-one for 3-methoxy-16-methyl-1,3,5(10)-estratrien-17-one in the procedure described in Examples 4 and 5 yields 3-ethoxy-16-methyl-2,5(10)-estradien-17β-ol. The compound shows absorption in the infrared at 2.80, 5.86, 5.98, and 8.18 microns.

Example 6

A solution of 0.1 part of 3-methoxy-16β-methyl-2,5(10)-estradien-17β-ol in 4.8 parts of a 10% solution of acetic acid in methanol is boiled for 5 minutes, cooled to room temperature and diluted with water. The product is collected by filtration and upon recrystallization from a mixture of water and ethanol there is obtained 16β-methyl-17β-hydroxy-5(10)-estren-3-one melting at about 147–150° C.

Example 7

To a solution of 0.66 part of 3-methoxy-16β-methyl-2,5(10)-estradien-17β-ol in 8 parts of methanol is added a solution of 0.8 part of water and 1.9 parts of concentrated hydrochloric acid. After standing at room temperature for 120 minutes, the solution is cooled and diluted with water. The precipitate is collected by filtration and upon recrystallization from a solution of benzene and dichloromethane there is obtained 16β-methyl-19-nortestosterone meltings at about 225–227.5° C. The compound shows absorption in the ultraviolet at 240 millimicrons with an extinction coefficient of about 17,800.

Example 8

To a solution of 2 parts of 3-methoxy-16β-methyl-1,3,5(10)-estratrien-17-one in 13 parts of benzene are added 10 parts of a 3 molar solution of methylmagnesium bromide in butyl ether. The solution is refluxed under a nitrogen atmosphere for 6 hours. The excess Grignard reagent is decomposed by the addition of acetone, and the reaction mixture is diluted with a slight excess of dilute hydrochloric acid. The mixture is then steam distilled and the oily residue is taken up in benzene and applied to a chromatography column containing silica gel. The column is developed with benzene and benzene solutions containing increasing amounts of ethyl acetate. Upon elution with a 2% solution of ethyl acetate in benzene and trituration of the residue with pentane there is obtained 3-methoxy-16β,17α-dimethyl-1,3,5(10) - estratrien - 17β - ol melting at about 81–82° C. Recrystallization from pentane it melts at about 99–100° C.

*Example 9*

A solution of 5 parts of potassium in 80.9 parts of 2-methyl-2-butanol and 35.6 parts of ether is cooled to 0° C. and then saturated with acetylene. Then a solution of 5 parts of 3-methoxy-16β-methyl-1,3,5(10)-estratrien-17-one in 26.2 parts of benzene is added and the reaction mixture is stirred under an acetylene atmosphere for 5 hours. The flask is stoppered and stored in a refrigerator at 5° C. for 15 hours. The solution is then partitioned between benzene and water and the organic layer is separated. The benzene solution is washed with water until neutral and vacuum distilled to dryness. Upon recrystallization of the residue from a solution of water and ethanol there is obtained 3-methoxy-16β-methyl-17α-ethynyl-1,3,5(10)-estratrien-17-ol melting at about 145–146° C.

*Example 10*

A solution of 2 parts of 3-methoxy-16β-methyl-17α-ethynyl-1,3,5(10)-estratrien-17β-ol in 100 parts of ethyl acetate is hydrogenated at 3 atmospheres of pressure over 0.2 part of a 5% palladium-on-charcoal catalyst. The catalyst is removed by filtration and the filtrate is evaporated to dryness. Upon recrystallization from a mixture of cyclohexane and benzene there is obtained 3-methoxy-16β-methyl-17α-ethyl-1,3,5(10)-estratrien-17β - ol melting at about 87.5–88.2° C.

*Example 11*

A suspension of 1.7 parts of 3-methoxy-16β-methyl-17α-ethyl-1,3,5(10)-estratrien-17β-ol in 41 parts of tetrahydrofuran is added to 126 parts of redistilled liquid ammonia and 35 parts of tertiary butanol. The suspension is stirred and a total of 1 part of lithium wire is added in small portions. Stirring is continued for 2½ hours after which the ammonia is replaced by the addition of 71 parts of ether and 8 parts of methanol. The ethereal layer is separated and washed successively with 1 N sodium hydroxide solution and water, dried over sodium sulfate and vacuum distilled to dryness. The residue is recrystallized from methanol which contains a small amount of pyridine to give 3-methoxy-16β-methyl-17α-ethyl-2,5(10)-estradien - 17β - ol melting at about 115–116.5° C.

*Example 12*

A solution of 0.15 part of 3-methoxy-16β-methyl-17α-ethyl-2,5(10)-estradien-17β-ol in 5.6 parts of a 10% solution of acetic acid in methanol is heated on a steam bath for 15 minutes, cooled and then diluted with water. The product, 16β-methyl-17α-ethyl-17β-hydroxy-5(10)-estren-3-one is isolated as an oily glass. The infrared spectrum shows the non-conjugated ketone absorption band at 5.82 microns in addition to those at 2.74, 7.95, 9.55, and 10.18 microns.

*Example 13*

A solution of 1.1 parts of 3-methoxy-16β-methyl-17α-ethyl-2,5(10)-estradien-17β-ol in 16 parts of methanol is added to a solution of 3.8 parts of concentrated hydrochloric acid in 1.6 parts of water. The solution is allowed to stand at room temperature for 2½ hours and then diluted with water. The solution is cooled and the precipitate is digested with cyclohexane and then recrystallized from a mixture of water and ethanol. In this manner there is obtained 16β-methyl-17α-ethyl-19-nortestosterone melting at about 127–128° C.

*Example 14*

A solution of 10 parts of the methyl ether of estrone in 261 parts of benzene, 3 parts of sodium hydride, 0.5 part of sodium methoxide and 6.5 parts of ethyl formate is stirred at reflux temperature under a nitrogen atmosphere for 5 hours. Then 34.2 parts of methyl iodide are added and the solution is refluxed for 15 hours. The reaction mixture is cooled and diluted with about 200 parts of water. The benzene layer is separated, washed with water and evaporated to dryness. The residue, containing 3-methoxy-16-formyl-16-methyl-1,3,5(10)-estratrien-17-one, is taken up in 200 parts of 20% aqueous ethanol containing 3 parts of sodium carbonate. This mixture is refluxed under a nitrogen atmosphere for 3 hours and then diluted with 100 parts of water. The solution is extracted with benzene and the benzene extracts applied to a chromatography column containing silica gel. The 16-methyl derivatives of 3-methoxy-1,3,5(10)-estratrien-17-one are eluted with a 1% solution of ethyl acetate in benzene. The first eluate, on concentration, yields 3-methoxy-16,16-dimethyl-1,3,5(10)-estratrien-17-one which, recrystallized from methanol, melts at about 94–95° C. Further elution with a 1% solution of ethyl acetate in benzene yields 3-methoxy-16α-methyl-1,3,5(10)-estratrien-17-one melting at about 117–119° C. after recrystallization from methanol. Still further elution with the same solvent mixture yields 3-methoxy-16β-methyl-1,3,5(10)-estratrien-17-one which after recrystallization from methanol melts at about 95–96° C.

*Example 15*

In the course of 2 hours, 50 parts of an 0.3 molar solution of potassium tertiary pentanoate in teritary pentanol is added portionwise under a nitrogen atmosphere to a solution of one part of 3-methoxy-16β-methyl-1,3,5(10)-estratrien-17-one in 11 parts of iodomethane. After three hours the mixture is rendered acidic with a small amount of acetic acid and then taken to dryness. The residue is washed with water and recrystallized repeatedly from methanol to yield 3-methoxy-16,16-dimethyl-1,3,5(10)-estratrien-17-one melting at about 93–94° C.

What is claimed is:
1. A compound of the structural formula

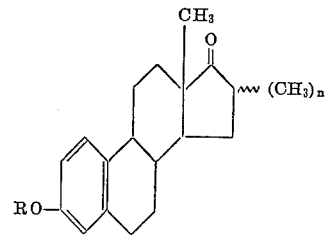

wherein R is a lower alkyl radical of less than three carbon atoms; $n$ is a positive integer less than 3.
2. 3-methoxy-16α-methyl-1,3,5(10)-estratrien-17-one.
3. 3-hydroxy-16β-methyl-1,3,5(10)-estratrien-17-one.
4. 3 - methoxy - 16,16 - dimethyl - 1,3,5(10)-estratrien-17-one.

References Cited in the file of this patent
Marrian et al.: J. Biochem., vol. 26, pp. 25–31 (1932).